Jan. 23, 1962 M. S. BAKER 3,017,941
VEHICLE DRIVE MEANS
Filed Feb. 27, 1958 7 Sheets-Sheet 1

INVENTOR.
Malvern S. Baker
BY
Soans, Anderson, Luedeka & Fitch
Attys.

Jan. 23, 1962 M. S. BAKER 3,017,941
VEHICLE DRIVE MEANS
Filed Feb. 27, 1958 7 Sheets-Sheet 2

INVENTOR.
*Malvern S. Baker*
BY
*Soans, Anderson, Suedeka & Fitch*
*Attys.*

Jan. 23, 1962  M. S. BAKER  3,017,941
VEHICLE DRIVE MEANS
Filed Feb. 27, 1958  7 Sheets-Sheet 6

INVENTOR.
Malvern S. Baker
BY
Evans, Anderson, Suedeka & Ditch
Attys.

United States Patent Office 3,017,941
Patented Jan. 23, 1962

3,017,941
VEHICLE DRIVE MEANS
Malvern S. Baker, Fort Wayne, Ind., assignor to J. I. Case Company, Racine, Wis., a corporation of Wisconsin
Filed Feb. 27, 1958, Ser. No. 718,075
5 Claims. (Cl. 180—6)

This invention relates generally to vehicle drive means, and is more particularly directed to an improved form of power transmission means which affords independent selective control of the speed and direction of each of a pair of final drive means for a vehicle.

Although the apparatus disclosed herein embodies novel features which might be used to advantage with other types of vehicles, as well as with stationary power units, it is believed that the most advantageous use of such features is in connection with crawler-type tractors and, therefore, such novel features are described herein in connection with a crawler tractor.

One of the important uses for crawler-type tractors is in conjunction with earth working and earth moving operations, wherein the operating load on the tractor is great and the operation of the unit requires considerable maneuvering, with frequent changes in the speed and direction of the tractor. In such operations, it is, of course, important that the tractor unit be easily and readily maneuvered, whether or not the tractor is operating under a load, with as little strain as possible on the tractor power unit. Furthermore, in earth working operations and the like, it is also important that the earth working unit be stable in operation and that the tractor be able to exert considerable tractive effort under all conditions. Consequently, the propelling unit most frequently used in such operations is a crawler-type tractor, which provides a maximum area of traction engagement with the ground as well as sufficient power to ordinarily handle the earth working operations.

Generally, however, the crawler-type tractors heretofore have not been considered to be very easy to maneuver, when compared to wheel type tractors for example. Previous crawler-type tractors have usually been steered by braking the drive to one of the tracks, in order to thereby pivot the unit about that track. Maneuvering in this manner requires more space than wheel mounted units. Further, it is usually more difficult to work in close quarters and to line up the tractor unit with a particular site to be worked, particularly since the driving by braking procedure results in a rather jerky motion of the tractor during maneuvering operations. Another deficiency in the ordinary tractors used heretofore in earth working operations, as well as those designed for other uses, is the relatively limited selection of operating speeds. Under conditions wherein the load on the tractor unit is almost constantly changing, either through a change in the actual load or a change in the amount of traction gained by the unit, it is necessary to frequently shift from one speed to another on the tractor. This not only diminishes the load handling efficiency of the tractor unit but it also slows down the overall operation.

Therefore, it is the primary purpose of this invention to provide improved vehicle drive means, including a novel power transmission unit, which is particularly designed to overcome the above mentioned deficiencies and afford easier maneuvering of a vehicle under all conditions.

A further object of the invention is to provide an improved vehicle drive means, which affords independent control of the speed and direction of a pair of final drive means on the vehicle. Still another object of the invention is to provide a novel drive means for a vehicle, including a reversible speed change transmission unit which affords independent control of the speed and direction of the vehicle final drive means and which receives its power from the engine through means including a fluid coupling, such as a torque converter.

It is also an object of this invention to provide a novel hydraulically controlled and hydraulically operated reversible multi-speed transmission, including a plurality of constantly meshing gears controlled through hydraulically operated clutch means. Still another object of the invention is to provide an improved form of hydraulically controlled speed change transmission, wherein a pair of final drive gears are independently controllable, with respect to speed and direction of rotation, through speed change and direction change gears mounted on a pair of shafts within the transmission housing and each having an associated independently operable clutch means.

A further object of the invention is to provide an improved form of reversible speed change transmission unit including an input shaft, a pair of output shafts, and a lay shaft intermediate the input shaft and each of the output shafts, with each lay shaft being independently controllable as to speed and direction of rotation, and wherein the several shafts are compactly arranged within the transmission housing.

Still another object of the present invention is to provide an improved power transmission means of the type described, wherein the speed change and direction change gears controlling each of a pair of final drive means are independently controlled through fluid pressure operated clutches, and wherein the control means for directing the flow of pressure fluid to the clutches is associated with the vehicle brake means in a manner affording halting of the flow of pressure fluid to one or more clutches upon actuation of one or both brakes. A further object of the invention is to provide novel means for controlling the flow of hydraulic fluid.

Other objects and advantages of this invention will be noted in the following description of the selected embodiment illustrated in the drawings (7 Sheets), wherein.

Figure 1:
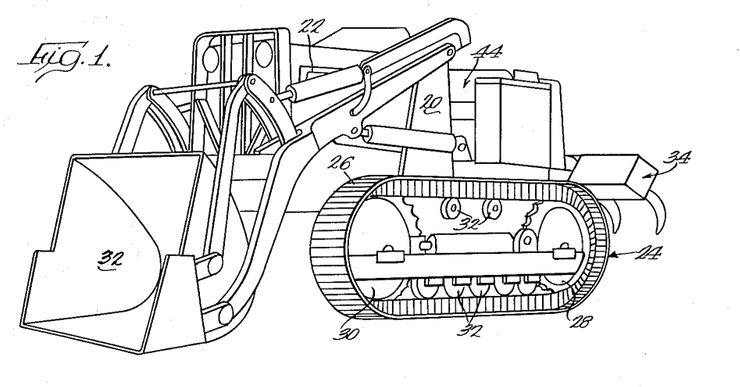
FIGURE 1 is a view of a crawler-type tractor unit having drive means embodying the principles of this invention.

As noted in FIGURE 1 of the drawings, the invention is illustrated in connection with a crawler-type tractor 20, having a power unit or engine 22 disposed at its forward end and connected in driving relation to a pair of endless track mechanisms 24 which are disposed on opposite sides of the tractor. Generally, each of the track mechanisms 24 comprises an endless steel track 26, which is disposed about a pair of track wheels 28 and 30, and a series of track rollers 32 arranged intermediate the track wheels in supporting relation to the upper and lower runs of the track. The track wheels and rollers are suitably journaled on the tractor frame structure, and at least the rear track wheel 28 is connected in driven relation with the engine 22. Each of the track wheels 28 and 30 is formed with circumferentially spaced teeth which engage the inner portion of the track 26, in order to thereby transmit drive from the wheels to the track in the usual manner.

The illustrated tractor is shown mounting a hydraulically operated shovel 32 at its forward end and a scarifier 34 at the rear. These implements do not form a necessary part of the present invention, but are shown primarily to illustrate examples of the usage of crawler tractors in connection with earth moving and earth working equipment. The present invention is more particularly directed to a greatly improved means for conveying power from the engine 22 to the separate track mechanisms 24 and, while the invention is especially advantageous in connection with crawler tractors mounting earth moving and earth working equipment, the invention is not limited in its application to such tractors or uses. Accordingly, a detailed description of the invention will be had with particular regard to the means for transmitting power to the tractor final drive, other and conventional portions of the tractor being referred to only in a general manner and when necessary to a more complete understanding of the invention.

Figure 3:
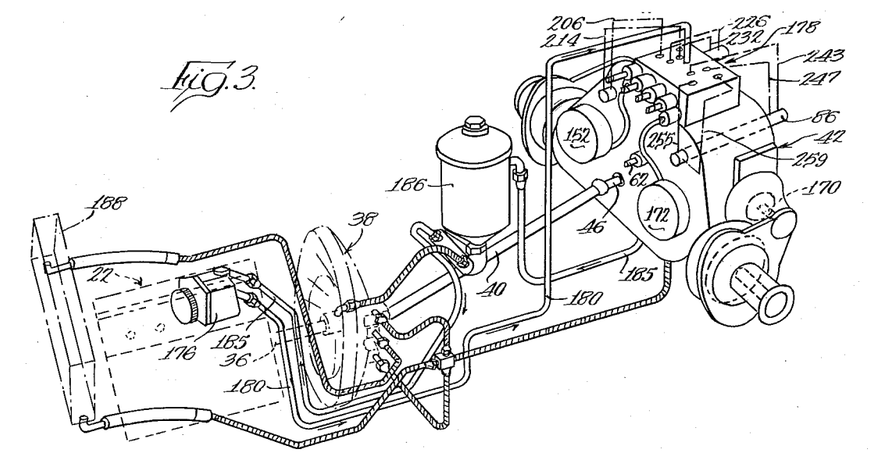
FIGURE 3 is a schematic view of the hydraulically operated and controlled drive means for the tractor.

With reference to the schematic illustration in FIGURE 3, it will be noted that the engine 22 has its power shaft 36 suitably coupled in driving relation to a fluid coupling in the form of a torque converter 38, which in turn conveys the power through a drive shaft 40 to a hydraulically controlled transmission unit indicated generally at 42. In the illustrated embodiment, the transmission unit 42 is located at the rear of the tractor, underlying the operator's seat 44 in FIGURE 1, and provides means for selectively supplying power from the torque converter to the final drive track wheels 28. The torque converter 38 is preferably a fluid drive coupling of known construction and therefore need not be described in detail. However, as will be pointed out later on in the description, it should be appreciated that the use of a fluid drive coupling intermediate the engine 22 and transmission unit 42 does afford particular advantages in connection with the novel drive means described herein.

Figure 4:
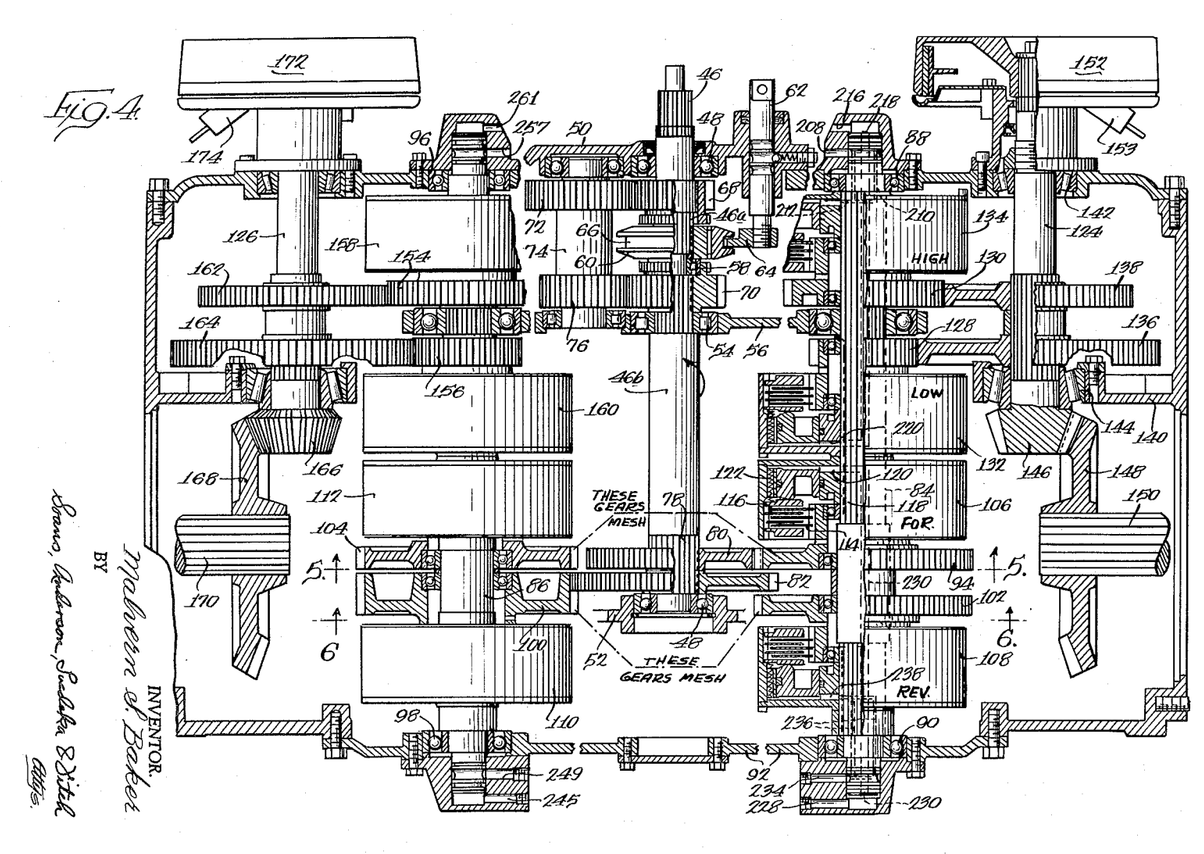
FIGURE 4 is a developed view of the hydraulic transmission, with parts broken away and in section and with portions moved out of their normal position in order to expose underlying structure.

The transmission unit 42 includes a power input shaft 46 which is coupled with one end of the drive shaft 40, as by a universal joint, the other end of the drive shaft being similarly connected with the torque converter 38. With reference now to FIGURE 4, it will be seen that the transmission input shaft is suitably journaled at opposite ends thereof, as by bearings 48, in the forward end wall 50 and an inner wall portion 52, respectively, of the transmission housing. More particularly, the input shaft comprises a pair of shaft sections 46a and 46b, which are coaxially arranged in longitudinally extending relation to each other. The rearward shaft section 46b has its forward end journaled, as by bearing 54, in a suitable opening in an inner wall portion 56 of the transmission housing. The forward end of shaft section 46b is suitably formed to provide a support for the rearward end of the shaft section 46a, as by means of an axial bore in shaft 46b which receives a bearing 58 and a reduced end portion of the shaft section 46a, to thereby provide for relative rotation between the two input shaft sections.

An intermediate portion of input shaft section 46a is splined to non-rotatably mount an axially shiftable, double clutch 60 which is controllable through operation of an axially shiftable rod 62 having a shift fork 64 on one end in engagement with an annular groove 66 on the clutch 60. The other end of rod 62 extends through the transmission housing and includes thereon a shift lever 63 (FIGURE 2) in position for operation of the clutch from the driver's seat on the tractor. The oppositely facing sides of the clutch 60 are provided with circumferentially arranged teeth which are adapted for engagement with inwardly facing teeth on the adjoining gears 68 and 70, respectively. The gear 68 is rotatably mounted on the input shaft section 46a and is in constant mesh with a gear 72 fixed on a countershaft 74 which is journaled in walls 50 and 56 of the transmission housing. Also fixed on this countershaft is a smaller gear 76 which is in constant mesh with the gear 70 on input shaft section 46b. Consequently, it will be seen that power can be transferred from the input shaft section 46a to the shaft section 46b either directly through engagement of clutch 60 with gear 70 or through the gears 68, 72, 76 and 70, respectively, thereby providing a selection of two different speeds for the input shaft section 46b as well as a means for halting the flow of power to shaft 46b by moving clutch 60 to the neutral position shown in FIGURE 4.

At the other end of the input shaft section 46b a pair of drive gears 80 and 82 are non-rotatably fixed to the shaft, as through means including the splines 78. Each of these drive gears is in constant mesh with a gear disposed on opposite ones of a pair of parallel lay shafts 84 and 86, which are arranged within the transmission housing above the input shaft 46. More particularly, the lay shaft 84 is journaled at its ends, as by bearings 88 and 90, in the opposite end walls 50 and 92, respectively, of the housing, and this shaft has rotatably mounted thereon a gear 94 which is in constant mesh with the drive gear 80. The other lay shaft 86 is also journaled, as by bearings 96 and 98, in the end walls of the transmission housing and has rotatably mounted thereon a relatively wide gear 100 which is in constant mesh with the other drive gear 82. As seen particularly in FIGURE 6, the wide gear 100 on lay shaft 86 is also in constant mesh with a second gear 102 rotatably mounted on the lay shaft 84. Furthermore, the gear 94 on lay shaft 84 is in constant mesh with a gear 104 which is rotatably mounted on the other lay shaft 86.

Figure 5:
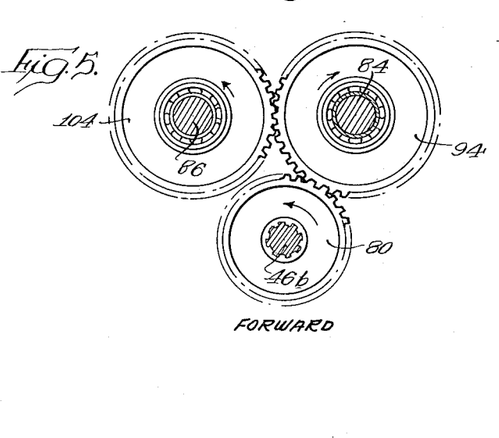
FIGURE 5 is a view of the transmission taken along the line 5—5 in FIGURE 4.
Figure 6:
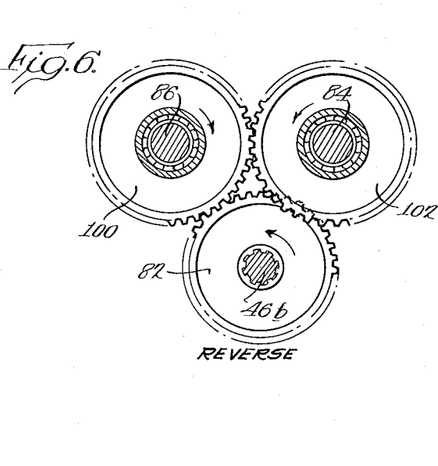
FIGURE 6 is another view of the transmission taken along the line 6—6 in FIGURE 4.
Figure 7:
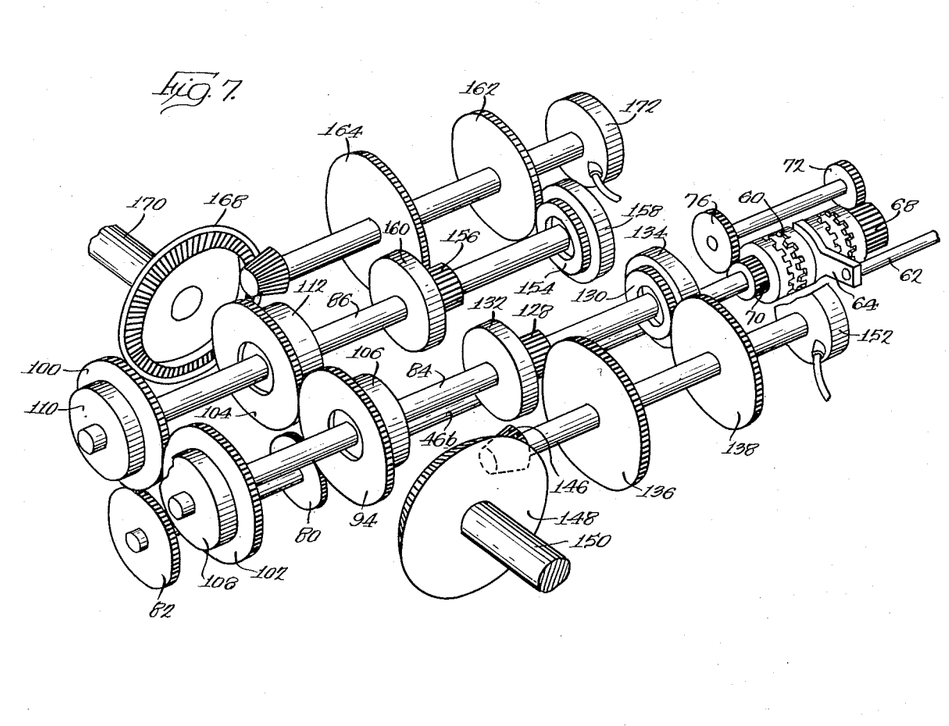
FIGURE 7 is a schematic illustration of the transmission gearing arrangement.

It will be seen therefore, as indicated in FIGURES 5–7, that the described arrangement of the drive gears 80 and 82 on the input shaft and their relationship to the gears 94, 102, 100 and 104 on the lay shafts 84 and 86 provides a counter rotation of meshing gears 94 and 104 and of meshing gears 100 and 102, with the gears on each of the lay shafts rotating in opposite directions.

Each of the rotatably mounted spur gears 94, 102, 100 and 104 has associated therewith a clutch means, indicated generally at 106, 108, 110 and 112, respectively, which is operable to secure the associated gear to its supporting shaft for rotation therewith. These clutch means are of known construction and may also assume other forms capable of accomplishing the desired result. In the illustrated embodiment, each of the clutch means is of the multiple-disc friction type and is operable by pressure fluid. A brief description will be given with respect to one of the clutches, namely clutch 106 associated with gear 94, it being understood that the other clutches are of similar construction. More particularly, the gear 94 has a forwardly extending hub portion which has fixed thereto a plurality of radially extending, spaced-apart friction plates 114. These plates extend between a series of annular friction elements 116 disposed within the clutch housing and fixed, as by splines 118, to the lay shaft 84 for rotation therewith. The clutch portion which includes the friction elements 116 is also slidable lengthwise of the lay shaft, through the introduction of pressure fluid into the clutch housing through passage 120 to move elements 116 into frictional engagement with the discs 114 and thereby secure the lay shaft 84 to gear 94 for rotation together. Upon release of the fluid pressure in the clutch housing, the friction elements 116 are returned to their normal spaced-apart relation with friction discs 114, as by means of a series of circumferentially spaced-apart springs 122 disposed between the clutch housing wall and the shiftable portion of the clutch.

Consequently, through selective operation of the clutches 106 and 108 on lay shaft 84, the latter may be driven from the input shaft in either of two directions. Similarly, lay shaft 86 may be selectively driven in either of two directions, independently of the rotation of lay shaft 84, through operation of the clutches 110 and 112 associated with gears 100 and 104, respectively. Furthermore, as seen particularly in the schematic diagram of the gear arrangement in FIGURE 7, as well as in FIGURES 5 and 6, the drive gear 80 provides a constant rotation of gears 94 and 104 in directions which are in opposition to the direction of rotation afforded by the drive gear 82 for the associated gears 102 and 100, respectively. In the illustrated embodiment, the drive gear 80 provides power for the tractor in a forward direction, and the drive gear 82 provides power in the reverse direction of travel. In this connection, it will be noted that gear 82 is somewhat larger than gear 80 and, since the driven gears on the lay shafts are all of equal circumference, this results in faster speeds for the tractor when traveling in reverse. This is particularly advantageous in earth-working operations, wherein the tractor is frequently under no load when traveling in reverse and is simply maneuvering to re-assume a load when it again proceeds in a forward direction. In view of their described function, the gears 94 and 104 may be conveniently referred to hereinafter as forward direction gears, and the gears 102 and 100 termed reverse direction gears. Similarly, the clutches 106 and 112 may be called the forward clutches and clutches 108 and 110 the reverse clutches.

Each of the lay shafts 84 and 86 also rotatably supports a pair of speed change gears, which are in constant mesh with spur gears fixed to a pair of output or counter shafts 124 and 126, respectively. The output shafts are disposed at opposite sides of the transmission in position to convey power to the final drive means for the endless track mechanisms on either side of the tractor. The pair of speed change gears on lay shaft 84 comprises gears 128 and 130, each of which is rotatably mounted on the lay shaft. Gear 128 is associated with a hydraulically operated friction clutch 132, in the manner described with respect to clutch 106 and direction gear 94, so that selective operation of clutch 132 fixes gear 128 to the lay shaft for rotation therewith. Similarly, gear 130 is associated with a clutch 134 which provides means for selectively securing the gear 130 to lay shaft 84. Gears 128 and 130, being of different sizes, afford different speeds of rotation for the associated driven gears 136 and 138, respectively, which are arranged on output shaft 124 in constant mesh with the speed change gears on lay shaft 84. The larger gear 130 will, of course, provide a higher speed of rotation for the output shaft 124 and, therefore, is designated as the high speed gear. Gear 128 will be designated as the low speed gear.

The output shaft 124 is journaled at its opposite ends in the end wall 50 of the transmission housing and an inner wall or bearing plate 140 within the housing, as by bearing means 142 and 144, respectively. The inner end of output shaft 124 has fixed thereto a bevel pinion gear 146, which meshes with a large bevel gear 148 fixed to a shaft 150 and comprising part of the final drive means which includes track wheel 28 (FIGURE 1) of the endless track mechanism 24 on the right side of the tractor.

The forward end of output shaft 124 projects through wall 50 of the transmission housing and has mounted thereon a friction brake 152 which is operable to halt the rotation of output shaft 124. Although other types of brake means may be employed, the illustrated brake 152 is operated by pressure fluid through the use of a hydraulic brake cylinder 153 to apply the necessary braking effect. As will be pointed out in detail later in the description, the introduction of pressure fluid to brake 152 is accompanied by a release of speed change gears 128 and 130 with respect to the shaft 84, to thereby improve the maneuverability of the tractor and to avoid damage to the clutches 132 and 134.

The other lay shaft 86, which provides the flow of power to the final drive means for the endless track mechanism 24 at the left of the tractor, includes an arrangement identical with that described for lay shaft 84. A pair of speed change gears 154 and 156 are rotatably mounted on the lay shaft 86 and have associated therewith a pair of clutch means 158 and 160, respectively, for selectively securing the speed change gears to lay shaft 86 for rotation therewith. A pair of gears 162 and 164 fixed on the output shaft 126 are in constant mesh with gears 154 and 156, respectively, and the inner end of the output shaft has fixed thereto a bevel pinion gear 166. Pinion gear 166 meshes with a large bevel gear 168, fixed on the shaft 170, which comprises part of the final drive means for the endless track mechanism 24 on the left side of the tractor. A brake 172, similar to brake 152, is provided on the outer end of the output shaft 126, and this brake is also operable through the introduction of pressure fluid to the brake cylinder 174.

Figure 8:
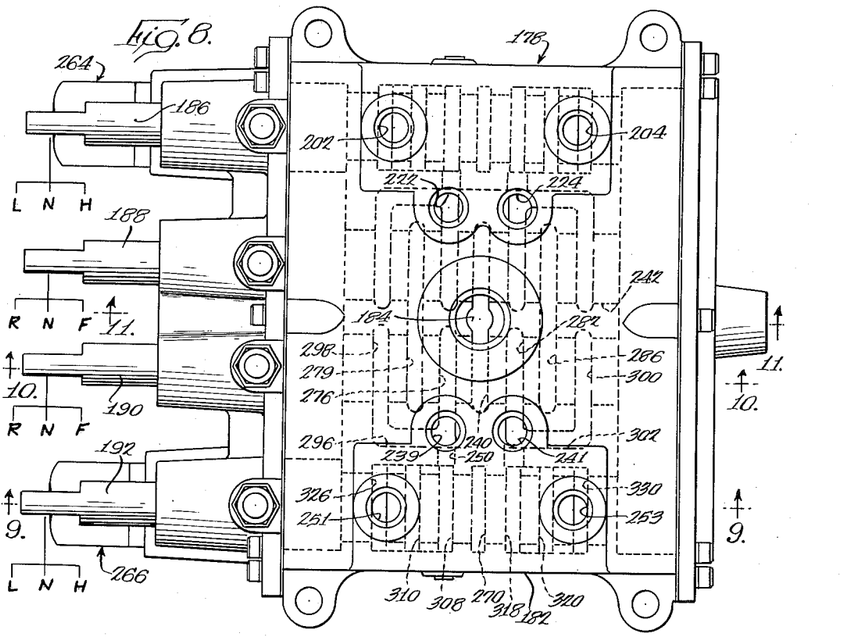
FIGURE 8 is an enlarged plan view of the control valve assembly for controlling the transmission.

Having in mind the transmission gearing arrangement and the clutches associated therewith, the means for controlling the latter will now be described. With reference first to FIGURE 3, it will be seen that the hydraulic system comprises generally a pump 176, suitably driven from the engine 22, a reservoir or sump formed by the lower part of the transmission housing, and a control valve assembly 178 which is mounted on top of the transmission housing. Pressure fluid is directed from the pump 176 through a suitable conduit, such as a hose 180, to the control valve assembly 178 where it enters the valve housing 182 through an intake port 184 (FIGURE 8). The pressure fluid in the valve housing is selectively directed to the previously described clutches in the transmission housing, through manual operation of the spool-type control valves 186, 188, 190 and 192 (FIGURE 8) by means of the control levers (FIGURE 2) 194, 196, 198 and 200, respectively, which are operatively connected therewith. Further, the pressure fluid is returned from the transmission clutches to the valve housing 182, where it is emptied into the transmission housing for return to the pump 176 through a conduit or hose 185 (FIGURE 3). A filter 186 is preferably provided in the fluid return line to remove any impurities from the oil or other hydraulic fluid being used in the system. It will also be noted in FIGURE 3, that fluid in the transmission housing is also utilized in the torque converter 38. For the latter purpose, it is desirable, if not necessary, to provide a cooling system 188 in the torque converter fluid lines.

Referring particularly to FIGURES 8–11, it will be noted that the control valve housing 182 includes a number of passageways therethrough, indicated by the broken lines in FIGURE 8, as well as eight pressure fluid discharge and return ports which are located in the top of the valve housing. The spool valves 186, 188, 190 and 192 are operable to control the flow of pressure fluid through the passages in the housing, so as to selectively discharge pressure fluid to the eight hydraulically operated clutches in the transmission housing, as well as to provide means for the return of such fluid. Generally, the control valve assembly 178 is symmetrical, with valves 186 and 188 controlling the flow of hydraulic fluid with respect to the clutches operating the drive for the track on the right of the tractor, and valves 190 and 192 controlling the flow of fluid with respect to the clutches for the endless track mechanism 24 on the left side of the tractor. More specifically, the valve 186 controls a pair of ports 202 and 204 which are in fluid communication with the clutches 134 and 132, respectively, which control the high and low speed gears 130 and 128 (FIGURE 4) on lay shaft 84. A flexible conduit or the like, indicated by the line 206 in FIGURE 3, connects port 202 with a bore 208 in the journal housing for the forward end of the shaft 84, and this bore intersects a pair of longitudinally extending passages 210 in the shaft which extend rearwardly to a lateral passage 212 communicating with the interior of the clutch 134. Similarly, a hose or the like, indicated by the line 214 in FIGURE 3, connects the port 204 with a bore 216 in the forward journal housing for lay shaft 84. Bore 216 intersects an axially extending passageway 218 in the shaft, which in turn communicates at its opposite end with a lateral passage 220 affording fluid communication with the interior of the clutch 132. In order to obtain a uniform operating pressure for the clutches, it is preferable that the flow capacity of passages 210 be equal to that of passage 218. It will also be understood that the conduits, passages, bores, etc. providing flow to the several clutches from the control valve housing 182, also afford a return of fluid to the housing from each of these clutches.

In a similar manner, fluid communication is provided between ports 222 and 224 (FIGURE 8), and the clutches 106 and 108, respectively, which control the forward and reverse drive gears 94 and 102. A conduit, indicated by line 226 in FIGURE 3, connects port 222 with a lateral bore 228 (FIGURE 4) in the rear journal for the shaft 84, and bore 228 intersects an axial bore or passage 230 which extends through the shaft to a lateral passage 120 communicating with the interior of the clutch 106. Another conduit, indicated by the line 232 in FIGURE 3, is connected to a second lateral bore 234 in the lay shaft end journal, and this bore communicates, through a pair of longitudinally extending passages 236 in the shaft, with a lateral bore 238 providing fluid communication with the interior of the clutch 108.

With respect to the drive for the left side of the crawler tractor 20, the ports 239 and 241 in the top of the valve housing 182 are in fluid communication with the forward and reverse drive clutches 112 and 110, respectively, for operation of the latter under the control of the spool valve 190, in the manner described above with respect to the ports 222 and 224 and the associated drive clutches 106 and 108. A conduit indicated by the broken line 243 in FIGURE 3, connects the port 239 with a passage 245 in the rear journal housing for lay shaft 86, and another conduit 247 connects the reverse drive port 241 with a second passage 249 in the same journal housing. These passages in the shaft journal housing are in fluid communication with the forward and reverse clutches 112 and 110, respectively, in the manner previously described with respect to the drive direction clutches on the lay shaft 84. A pair of ports 251 and 253 in the valve housing 182 provide fluid communication with the clutches 158 and 160 operating the high and low speed change gears for the left side of the tractor, in the same manner described for the related clutches 134 and 132 on the right side of the tractor. A conduit, indicated by the broken line 255 in FIGURE 3, connects the port 251 with a passage 257 in the forward end journal for the lay shaft 86, and another conduit or hose 259 provides communication between the port 253 and a passage 261 in the same journal. The flow of fluid from these passages to the high and low speed clutches 158 and 160 is identical with that described for the clutches 134 and 132.

It will be noted, therefore, that the valve control assembly is symmetrical in structure. Consequently, a detailed description of its structure and operation will be had with respect only to the side controlling the drive to the left track mechanism on the tractor, which portion of the valve assembly is shown in detail in FIGURES 9–11.

Figure 9:
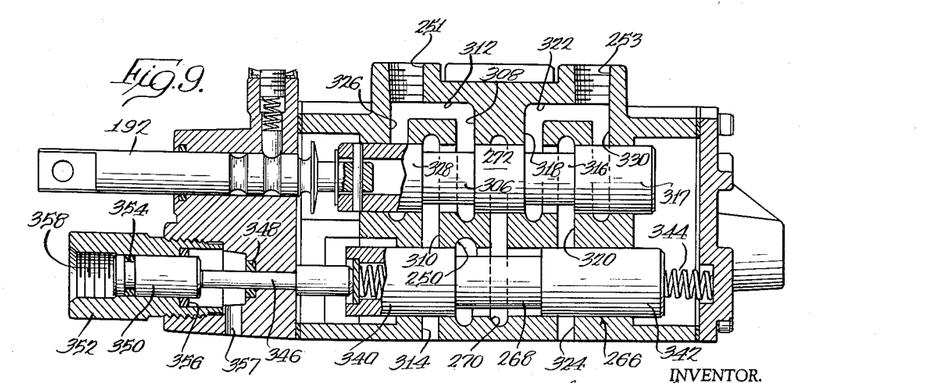
FIGURE 9 is a sectional view taken along the line 9—9 in FIGURE 8.
Figure 10:
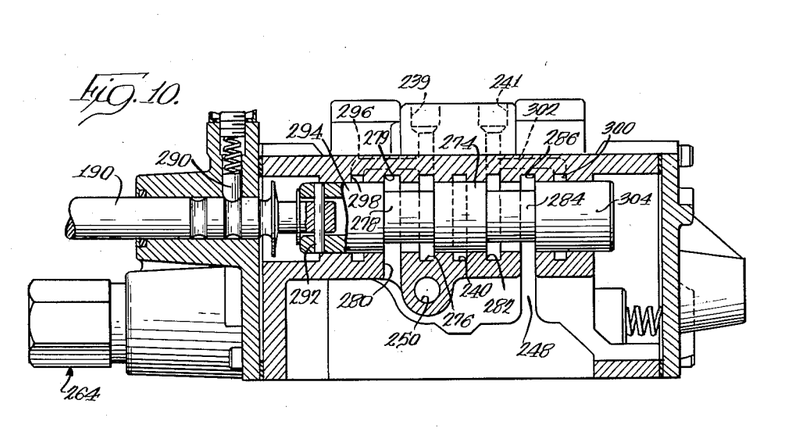
FIGURE 10 is a sectional view taken along the line 10—10 in FIGURE 8.
Figure 11:
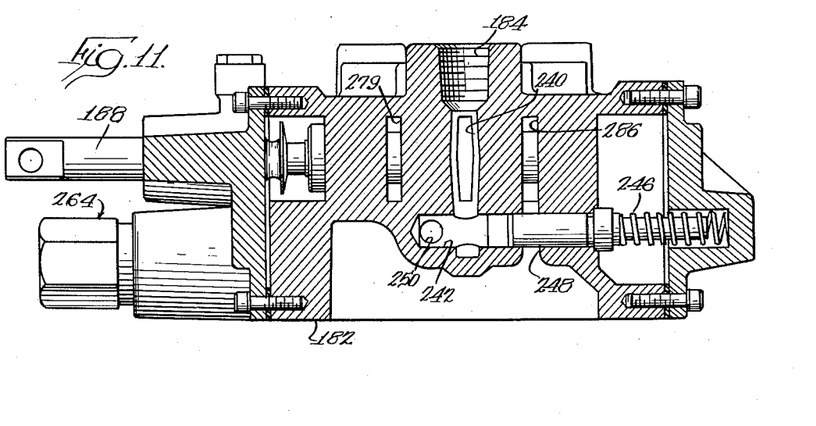
FIGURE 11 is a sectional view taken along the line 11—11 in FIGURE 8.

Referring now to FIGURES 9–11, the flow of pressure fluid between the intake port 184 and the ports 239 and 241 leading to the forward and reverse drive clutches 112 and 110, respectively, will be followed. This flow is controlled by the spool valve 190, which is shown in FIGURE 10 in its neutral position blocking the flow of pressure fluid to both port 239 and port 241. As the pressure fluid from the pump 176 enters the intake port 184 (FIGURE 11), it flows into a laterally extending and narrowing passage 240, which in turn is intersected at the lower center portion of the valve body by a longitudinal bore 242 housing a pressure relief valve 244 in its rearward portion. The valve 244 is biased by a spring 246 into a position blocking an exhaust passage 248 which leads through the bottom of the valve housing into the transmission housing. In this latter respect, it should be noted that the valve housing 182 is disposed in covering relation to an enlarged opening (not shown) in the top of the transmission housing. Consequently, exhaust passages provided in the bottom of the control valve housing communicate directly with the transmission housing, the lower portion of which serves as a sump or reservoir for the hydraulic fluid in the transmission control and torque converter system.

At the forward end of the bore 242 (FIGURE 11), there is an intersecting transverse bore 250 which extends below the chambers for spools 188 and 190 to a pair of lower chambers disposed at each side of the valve assembly and housing a pair of brake-controlled spool valves 264 and 266 (FIGURES 8 and 9). As noted particularly in FIGURE 9, as the pressure fluid enters the chambers for each of these brake valves, it is free to flow along a reduced center portion 268 of the brake valve into a transverse passage 270 extending upwardly into the chamber for the valves 186 and 192 which control the high and low speed gear clutches. However, when the spool valves 186 and 192 are in their center or neutral position, as seen in FIGURE 9, the center spool 272 of the valve blocks passage 270 to prevent further flow of the pressure fluid.

Referring again to FIGURES 10 and 11, it will be seen that the pressure fluid entering the intake port 184 also flows transversely of the valve housing, through the passage 240 which extends into the chambers for the spool valves 188 and 190. When either of these valves is in its center or neutral position, as shown in connection with valve 190 in FIGURE 10, a center spool 274 on the valve blocks further passage of the pressure fluid. Furthermore, with valve 190 in the illustrated position, there is provided a return flow of fluid from the direction clutches back to the sump provided in the transmission housing. The fluid in the forward clutch line flows through port 239 downwardly into a transverse passage 276, and then along a reduced valve section 278 to another transverse passage 279 having an opening 280 through the bottom of the valve housing. The fluid in the reverse clutch line flows through port 241 into a transverse passage 282, along a reduced valve section 284, and then into a transverse passage 286 which includes the relief opening 248 through the bottom of the valve housing.

Figure 2:
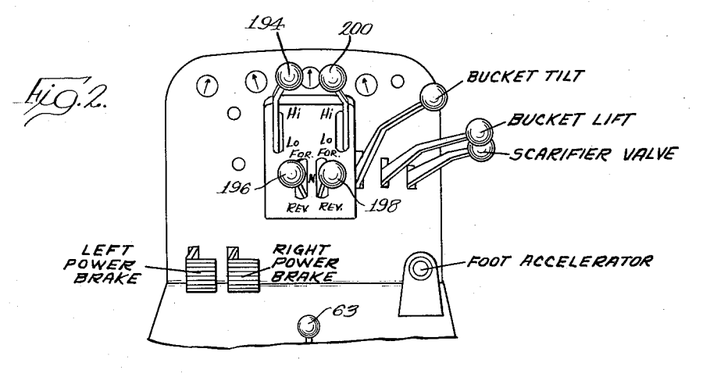
FIGURE 2 is a fragmentary view of the tractor, particularly illustrating the drive control levers.

As already indicated, the valve spool 190 is controlled from the operator's station through the lever 196. The valve has three positions of operation, which are indicated in FIGURE 2 and which are accurately determined by a detent 290 (FIGURE 10) engaging one of three annular grooves provided in the valve stem. It will be understood, of course, that each of the spool valves is closely fitted in its chamber and a suitable oil seal is provided at the end of the valve which is connected with the operating stem. Further, it is preferred that the stem be pivotally connected to the end of the valve, as by the pin 292, in order to avoid any possibility of lateral motion of the valve operating stem being transmitted to the valve spool proper and thereby binding or causing wear on the spool sections.

To effect a flow of pressure fluid through the port 239 to the forward drive clutch, the valve 190 is moved rearwardly, through movement of lever 196 to its forwardmost position indicated in FIGURE 2. This shifts the valve 190 to the right in FIGURE 10, so that spool 294 at the left closes off the passage 279 and the opening 280 leading to the reservoir. The adjoining reduced section 278 is thereby placed in spanning relation to the passages 276 and 240, to permit the fluid pressure in the latter to flow along section 278 and upwardly in passage 276 and out through the port 239 leading to the forward clutch. A horizontal passage 296, indicated by broken lines as being off-center with respect to the valve 190 and which provides fluid communication between passage 276 and a parallel transverse passage 298, is blocked by the spool 294. The central spool section 274 blocks off passage 282 to prevent the flow of fluid past the valve at this point. However, the relief of port 241 is provided for by corresponding movement of the reduced valve section 284 to a position placing passage 286 in communication past the valve with a transverse passage 300. The upper end of the latter is in communication with the lower end of port 241 through a horizontal passage 302, indicated by broken lines as being off-center with respect to the valve 190. Thus, it is seen that any pressure fluid in the line leading from port 241 to the reverse clutch can return through port 241, passages 302 and 300, and flow along the reduced section 284 to passage 286 where it will flow through opening 248 into the transmission housing.

When the lever 196 (FIGURE 2) is moved downwardly and rearwardly, the valve 190 (FIGURE 10) is moved forwardly to provide for the flow of pressure fluid through port 241 to the clutch 110 to effect a reverse rotation of the lay shaft 86. In thus moving valve 190 to the left in FIGURE 10, the right hand spool 304 is positioned across passage 286 to block the return of fluid to the sump through this passage. The reduced valve section 284 is thereby placed in spanning relation to passages 240 and 282, to permit pressure fluid in the former to enter passage 282 and then flow upwardly through port 241. The center spool 274 is now positioned in blocking relation to passage 276. However, the return of fluid in the line connected with port 239 is provided for by the disposition of the reduced valve section 278 in spanning relation to the transverse passages 298 and 279. Any fluid in the forward clutch and the conduit leading thereto may thereby flow back through port 239 and into passage 296 leading to the transverse passage 298. From passage 298 the fluid can flow along the reduced valve section 278 to passage 279 and then downwardly through opening 280 into the transmission housing.

With reference now to FIGURE 9, the manner of control afforded by the valve 192 with respect to the high and low speed clutches will be noted. In the drawing, the valve 192 is in its neutral position as previously noted. While the flow of pressure fluid past the valve to the high and low speed clutches is blocked by the position of spool 272 with respect to the passage 268, means is afforded for the return of fluid from the clutches. It will be noted that one of the reduced valve sections 306 is disposed to span a pair of transverse passages 308 and 310. The former is in communication with the port 251, through a horizontal passage 312, and the latter passage 310 extends downwardly past the brake spool valve 266 and includes an opening 314 through the bottom of the valve housing. Consequently, any fluid in the conduit connected with port 251 can flow back through the port into passage 312 and then through passage 308, along valve section 306 into passage 310, and out through the opening 314 into the transmission housing.

Relief for the low speed clutch connected with port 253 is provided in the valve assembly through the disposition of another reduced valve section 316 in spanning relation to a pair of transverse passages 318 and 320. Passage 318 is in fluid communication with the bore 253 through a horizontal passage 322, and passage 320 extends downwardly past the brake spool valve 266 to include an opening 324 through the bottom of the valve housing. Consequently, any fluid in the line to the low speed clutch can return to the control valve housing through port 253 and passage 322 into the passage 318. The fluid can then flow along reduced valve section 316 into passage 320 and then downwardly through opening 324 into the transmission housing.

The spool valve 192 is movable in opposite directions, with respect to the neutral position shown in FIGURE 9, to selectively operate the high speed and low speed clutches 158 and 160, respectively, through the discharge of pressure fluid through the ports 251 and 253 in the control valve housing. In order to operate the high speed clutch, lever 194 (FIGURE 2) is moved upwardly and this results in a movement of the control valve 192 to the right in FIGURE 9, until the reduced valve section 306 spans the transverse passages 308 and 270. This permits pressure fluid, which has entered passage 270 from the transverse bore 250, to flow from passage 270, past the reduced valve section 306 to passage 308, and then through horizontal passage 312 to the port 251 which is connected with the high speed clutch housing. At the same time a transverse passage 326, also in communication with port 251, and the transverse passage 310 communicating with the interior of the transmission housing are blocked by the spool section 328. Moreover, the port 253, which is in fluid communication with the low speed clutch housing, is relieved by the disposition of the reduced valve section 316 in spanning relation to the passages 320 and 330. This affords a flow of any fluid in the line connected with port 253 into passage 330 and along valve section 316 into passage 320, from which it can pass downwardly through the opening 324 into the reservoir provided in the bottom of the transmission housing.

In order to operate the low speed clutch, lever 194 (FIGURE 2) is moved downwardly and this results in a movement of the control valve 192 to the left in FIGURE 9, until the reduced valve section 316 spans the transverse passages 318 and 270. The pressure fluid in the latter can now flow past the reduced valve section 316 into passage 318 and then through the horizontal passage 322 to the port 253 which is connected with the low speed clutch. At the same time, spool 317 is disposed in blocking relation to passages 330 and 320. Port 251, which is connected with the high speed clutch, is relieved by the disposition of the reduced valve section 306, which has now moved into spanning relation to the passages 326 and 310. Any fluid in the line connected with port 251 can flow into passage 326 and along valve section 306 to passage 310 which is in communication with the sump through opening 314.

Figure 12:
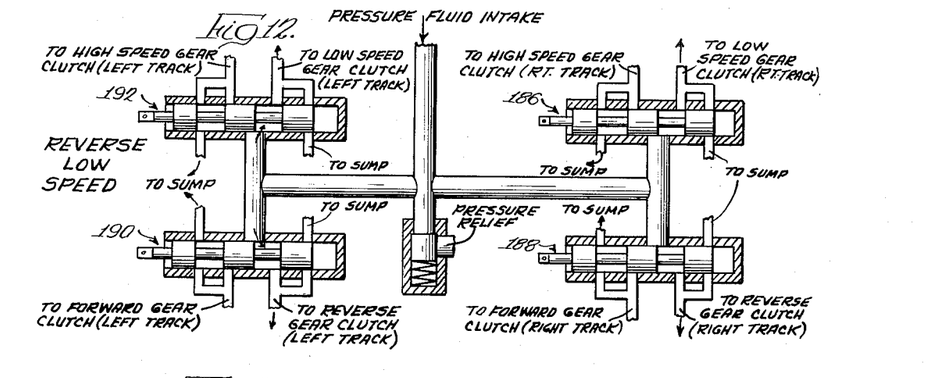
FIGURE 12 is a schematic illustration of the flow of fluid in the control valve housing, when the tractor is driven in a forward direction at high speed.
Figure 13:
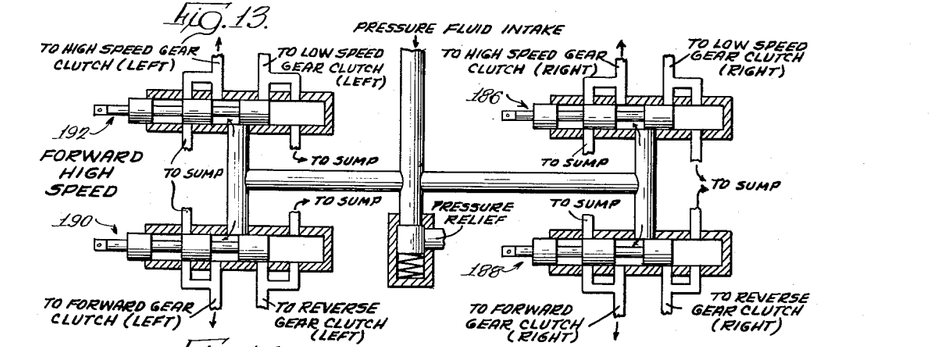
FIGURE 13 is a schematic illustration of the flow of fluid through the control valve housing, when the tractor is traveling in a reverse direction at low speed.
Figure 14:
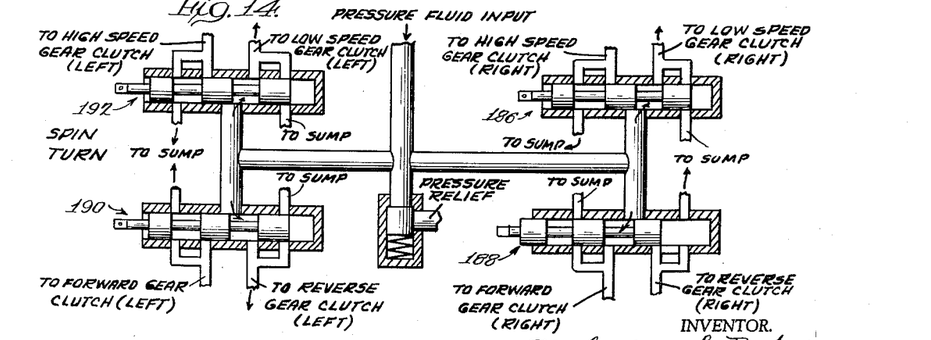
FIGURE 14 is a schematic illustration of the flow of fluid through the control valve housing, when the tractor is turning about its own center with one track moving forward and one track moving in the reverse direction.
Figures 15, 16:
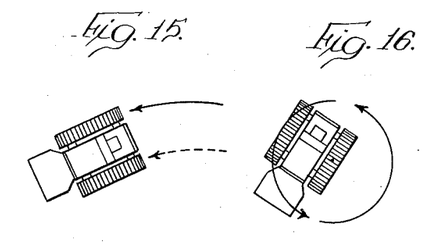
FIGURES 15 through 17 are schematic illustrations of the tractor in each of several turning movements afforded by the present invention.
Figure 17:
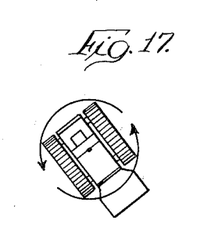

It is seen from the foregoing how the speed change and direction clutches on each of the transmission lay shafts 84 and 86 are independently controlled through operation of the valves 186, 188, 190 and 192. To assist in better understanding the operation of these control valves and their effect on the tractor final drive mechanism, there are provided schematic illustrations of the hydraulic control in FIGURES 12–14. FIGURE 13 illustrates the position of the various control valves to achieve high speed travel in a forward direction. FIGURE 12 shows the valves shifted to achieve reverse drive for both tracks in low speed, and FIGURE 14 illustrates the disposition of the control valves to achieve a reverse drive on one track and a forward drive on the other track, in order to spin the tractor about its center, as shown in FIGURE 17. It will be understood, of course, that FIGURES 12–14 are merely examples of the final drive control made possible with the present invention and other combinations of clutch control operations can be readily achieved with the described arrangement. For example, referring to FIGURE 12, valves 192 might be shifted to provide pressure fluid to the low speed gear clutch, while valve 186 is retained in its illustrated position. Thus, the left track would move at a slower rate than the right track, resulting in a smooth power turn to the left, as illustrated in FIGURE 15. Then too, one of the tracks might be braked while the power to the other track continues, to thereby achieve a pivoting of the tractor about the center of one track, as seen in FIGURE 16.

It is also to be noted that operation of either or both brakes for the tractor provides a further control for the hydraulic system which regulates the transmission unit. As previously mentioned, the control valve housing 182 also includes a pair of brake spool valves 264 and 266 which are associated with the high and low speed clutches for the right and left track mechanisms, respectively. Since these valves are identical in structure and operation, it is believed that a description of one will suffice.

With reference to FIGURE 9, it is seen that the brake controlled spool valve 266 comprises a pair of spools 340 and 342 disposed on opposite sides of the reduced valve section 268. At one end of the valve there is a coil spring 344, which is disposed to bias the valve into its normal position shown in FIGURE 9. In this position, the pressure fluid in passage 250 is free to move along the reduced valve section 268 to passage 270 leading to the overlying chamber for the valve 192 controlling one pair of the high and low speed clutches in the transmission. At the other end of the valve 266, to the left in FIGURE 9, there is a push rod 346, which is slidably disposed within a front portion of the control valve housing in coaxial alignment with valve 266. A suitable oil seal, such as an O-ring 348, is provided for the reduced outer end portion of the push rod. The absence of any connection between the push rod and the brake valve 266, the disposition of the push rod in the housing, and the presence of an oil seal around the push rod provide an arrangement whereby the valve 266 may be moved by an external control means without endangering the close fit and alignment of the control valve or affording means for dirt to enter the control valve chamber.

The actuation of the push rod 346 is effected by means including a piston 350 slidably disposed within a housing 352, which housing is screwed into a threaded opening in the main valve housing surrounding the projecting end of the push rod 346. Oil seals 354 and 356 are preferably provided at each end of the piston 350. The inner end of the piston 350 is disposed in engagement with the reduced end of the push rod, so that pressure on the piston is transmitted through the push rod to the valve 266, to thereby move the spool valve 266 inwardly in opposition to the spring 344. The outer end of the piston housing 352 includes means, such as an internally threaded bore 358, affording connection with the end of a flexible hose or the like (not shown) that is connected at its other end with the power cylinder of the hydraulically operated brake 172. Consequently, as the left brake pedal is operated to effect actuation of the hydraulic cylinder 174 for brake 172, pressure fluid from the brake cylinder is also transmitted to the end of the piston 350 to cause the latter to move inwardly and thereby effect a shift of the valve 266 to the right, as viewed in FIGURE 9. This movement of the valve shifts the spool 340 to a position blocking the flow of pressure fluid entering the valve chamber through the passage 250, thereby preventing pressure fluid from reaching the chamber above which houses the valve 192. At the same time the reduced portion 268 of valve 266 bridges passages 270 and 320 thus allowing fluid in passage 270 to escape through opening 324. Assuming the high speed clutch 158 to be engaged, valve 192 will be in the position such that reduced portion 306 will bridge passages 308 and 270 so that fluid will be exhausted from clutch 158 through port 251 which is in communication with passages 312, 308, reduced portion 306, passage 270, reduced portion 268 of valve 266, and opening 324. Thus clutch 158 will be promptly released so as not to be attempting to drive while brake 172 is engaged.

As will be apparent, under these conditions low speed clutch 160, which is connected to port 253 is already exhausted by reason of bridging of passageways 330 and 320 by reduced portion 316 of valve 192.

As will be apparent a similar effect will be produced if the valve 192 happens to be shifted for low speed operation of the final drive on that side of the tractor. While the high speed clutch is already exhausted through port 251 passages 326 and 310, bridged by reduced portion 306, and opening 314, passage 250 will be blocked by spool portion 340 while low speed clutch 160 will be exhausted through port 253, passages 322, 318, reduced portion 316, passage 270, reduced portion 268 of valve 266 and opening 324. Thus at any time that a brake is applied to either of the final drive mechanisms whether engaged in low or high speed, whichever clutch happens to be engaged will be immediately cut off and exhausted of pressure fluid so as to promptly disengage. Accordingly regardless of which of clutches 112 (forward) or 110 (reverse), happens to be engaged, lay shaft 86 will merely rotate idly so that brake 172 may stop the final drive without overcoming any power applied to that particular final drive. It is seen, therefore, that actuation of either or both brakes automatically releases the clutches controlling the speed of the tractor. When the brake is released, the fluid pressure on the end of piston 350 is also relieved, and spring 344 returns the valve 266 to its neutral position and the tractor proceeds in the manner it was traveling prior to the application of the brake.

The fluid commonly used in hydraulic brakes, as is well-known, is generally not satisfactory for use in hydraulic circuits of the type herein disclosed for shifting the clutches 158, 160, etc., and to prevent any possibility of intermingling of the two fluids, the space between oil seals 356 and 348 is vented to the atmosphere through an opening 357, and not into transmission unit 42. Thus while oil seals 356 and 348 are highly dependable, any seepage which may develop after long use will be discharged harmlessly through opening 357.

It will be seen, therefore, that a vehicle drive constructed in accordance with the principles of the present invention affords real advantages and provides operational characteristics for a vehicle which were hitherto unknown. The use of a fluid coupling, such as a torque converter, in transmitting power from the engine to the transmission unit controlling the final drive, has the very desirable effect of providing an infinite number of automatic gear ratios, up to maximum speed for the vehicle, whereby a maximum power output is realized for the engine irrespective of the load on the tractor. The torque converter adjusts itself automatically to a change in the load and a smooth flow of power is maintained continuously without requiring the shifting of gears or resulting in stalling of the engine. These and other advantageous characteristics of the torque converter are combined with the novel and versatile speed change transmission to provide a vehicle drive which affords a mode and degree of vehicle drive control never before achieved.

Then too, the novel reversible speed change transmission disclosed herein is, of itself, extremely advantageous in providing independent control of a pair of final drive means. A transmission unit constructed in accordance with the principles of this invention affords a quick and yet smooth change in the speed and/or direction of either or both final drives, which requires no shifting of gears and operates substantially without regard to the load on the tractor unit. The combination of constantly meshing gears in the transmission housing, hydraulically operated clutches for selecting the gears to be used, and independent drive from the transmission input shaft to each of the final drive means, provides a form of vehicle drive control that is particularly beneficial in operations which require a considerable amount of vehicle maneuvering and wherein there is a frequent change in the amount of load on the vehicle. Furthermore, the hydraulic control disclosed herein, including the control through braking of one or both final drives on the vehicle, makes it extremely easy for the operator to almost instantly adjust the speed and/or direction of either or both final drive means to meet constantly changing conditions encountered during operation of the tractor or other vehicle embodying the principles of this invention.

As previously pointed out and as illustrated, in part, in FIGURES 15–17, the described form of vehicle drive means affords a considerable number of possible forms of vehicle control in maneuvering the unit. Smooth power turns, with the two final drive means operating at different speeds and without the use of a differential gearing arrangement, makes it very easy to follow a curving path of travel without use of any braking means. Moreover, this form of steering may be achieved in either a forward or reverse direction of travel. Then too, with the present invention the vehicle operator is able to pivot the unit about its own center by simply reversing one final drive while continuing the other in a forward direction. This is particularly advantageous in operations where maneuvering space is quite limited with respect to the size of the vehicle unit. It is also to be noted that this invention affords pivoting of the vehicle about one of its travelling supports, such as a crawler track, by braking one of the final drive means as the other continues forwardly or rearwardly as desired. Further, in so braking the one final drive, the flow of power to that final drive means is halted through automatic operation of the novel hydraulic system controlling the power transmission unit.

All of the foregoing advantages are achieved through a novel combination and arrangement of drive and drive control elements which are compactly arranged in a relatively small space. Consequently, the principles of this invention may be employed in small tractors or other vehicles, as well as in larger units.

Although shown and described with respect to particular structure and with regard to a crawler-type tractor, it will be apparent that various modifications might be made and adapted to other uses, without departing from the principles of this invention. Furthermore, while the invention is believed to be of particular advantage in connection with vehicle drive means, it should be recognized that certain of the novel features disclosed herein, including the reversible speed change transmission and its control means, may be used to advantage elsewhere.

I claim:

1. In a crawler tractor including a frame structure, an engine supported on said frame structure, and a pair of endless track mechanisms carried by the frame at opposite sides thereof, means for transmitting power from said engine to each of said endless track mechanisms, said means comprising a power transmission unit including a housing, an input shaft journaled in said housing and drivenly connected with said engine, a pair of drive gears fixed on said input shaft within said housing, a pair of lay shafts journaled in said housing in spaced relation to each other and to said input shaft, a forward direction gear and a reverse direction gear rotatably mounted on each of said lay shafts, said pair of drive gears being disposed, respectively, in constant mesh with the forward direction gear on one of said lay shafts and with the reverse direction gear on the other of said lay shafts, said forward direction gears on said lay shafts being disposed in constant mesh with each other and said reverse direction gears on said lay shafts being also disposed in constant mesh with each other, a plurality of speed change gears rotatably mounted on each of said lay shafts, a pair of power output shafts journaled in said transmission housing, a brake on each of said output shafts, control means on said tractor for each of said brakes, each of said output shafts being associated with one of said lay shafts and having fixed thereon a plurality of gears disposed, respectively, in constant mesh with said plurality of speed change gears on the associated lay shaft, means connecting each of said output shafts to one of said endless track mechanisms in driving relation thereto, a plurality of hydraulically operable clutch means fixed to said lay shafts in controlling relation, respectively, to each of said forward, reverse, and speed change gears, a source of fluid pressure on said tractor having fluid communication with each of said clutch means, and control means for selectively directing pressure fluid from said source to each of said clutch means, said control means comprising a control valve housing including a fluid inlet passage in communication with said source of pressure fluid, a fluid outlet passage in said housing for each of said clutch means, separate manually operated control valves in said housing for controlling the flow of pressure fluid from said fluid inlet passage to said fluid outlet passages for the clutch means for said direction gears and to said fluid outlet passages for the clutch means for said speed change gears, respectively, an additional valve in said housing for controlling the flow of pressure fluid to said fluid outlet passages for the clutch means for said speed change gears, each of said additional valves being controlledly connected with one of said brake control means, whereby the application of a braking force to one of said brakes is effective to halt the flow of pressure fluid to the clutches controlling the speed change gears on the associated output shaft, and means providing communication between said fluid outlet passages and the associated clutch means, whereby the speed and direction of movement of each of said endless track mechanisms is independently controllable through operation of said control valves, and whereby the braking of one of said output shafts automatically effects a halt in the flow of power to said output shaft from said engine.

2. In a vehicle including an engine, a final drive means, fluid actuated brake means for said final drive, a power transmission unit for connecting said engine with said final drive and including speed change gearing, hydraulically operated clutch means associated with said speed change gearing and operable to selectively control the flow of power through said gearing, and control means for said clutch means comprising a control valve housing having fluid communication with a source of pressure fluid through an intake port in said housing and having fluid communication with said clutch means through a discharge port in said housing, a manually operable control valve in said housing which is movable to control the flow of pressure fluid from said intake port through said discharge port to engage said clutch means and having a clutch releasing position in which fluid is discharged from said clutch means so that said clutch means is disengaged, and means in said control valve housing which is operable in response to fluid pressure in said brake means to disable said control valve and discharge fluid from said clutch means.

3. In a vehicle including an engine, a final drive means, a hydraulically operated brake means for said final drive, a power transmission unit connecting said engine with said final drive, and including speed change gearing, hydraulically operated clutch means associated with said speed change gearing and operable to selectively control the flow of power through said gearing, and control means for said clutch means comprising a control valve housing having fluid communication with a source of pressure fluid through an intake port in said housing and having fluid communication with said clutch means through a discharge port in said housing, a manually operable control valve in said housing which is movable to control the flow of pressure fluid from said intake port to and from said clutch means through said discharge port, a second valve in said housing in controlling relation to the flow of pressure fluid from said intake port to said control valve, and means connecting said second valve with said hydraulically operated brake in a manner such that the introduction of pressure fluid to said brake to thereby halt said final drive is also effective to move said second valve to a position blocking the flow of pressure fluid from said intake port to said control valve, thereby releasing said clutch means and halting the flow of power from said speed change gearing to said final drive means.

4. In a vehicle including an engine and a final drive means, a brake for said final drive means, a power cylinder for said brake, a power transmission unit for connecting said engine with said final drive including speed change gearing, hydraulically operated clutch means associated with said speed change gearing and operable to selectively control the flow of power through said gearing, and control means for said clutch means comprising a control valve housing having fluid communication with a source of pressure fluid through an intake port in said housing and having fluid communication with said clutch means through a discharge port in said housing, a manually operable control valve in said housing which is movable to control the flow of pressure fluid from said intake port through said discharge port to engage said clutch means and having a clutch releasing position in which fluid is discharged from said clutch means so that said clutch means is disengaged, and auxiliary valve means in said control valve housing operable in response to pressure in said power cylinder upon actuation of said brake, arranged to cut off said control valve from said source of pressure fluid and to discharge fluid from said clutch means.

5. In a vehicle including an engine and a final drive means, a brake for said final drive means, a power cylinder for said brake, a power transmission unit for connecting said engine with said final drive including speed change gearing, hydraulically operated clutch means associated with said speed change gearing and operable to selectively control the flow of power through said gearing, and control means for said clutch means comprising a control valve housing having fluid communication with a source of pressure fluid through an intake port in said housing and having fluid communication with said clutch means through a discharge port in said housing, a manually operable control valve in said housing which is movable to control the flow of pressure fluid from said intake port through said discharge port to engage said clutch means, and auxiliary valve means in said control valve housing operable in response to pressure in said power cylinder upon actuation of said brake, arranged to cut off said control valve from said source of pressure fluid.

References Cited in the file of this patent

UNITED STATES PATENTS

| | | |
|---|---|---|
| 1,646,552 | Mosel | Oct. 25, 1927 |
| 2,352,593 | Allin | July 4, 1944 |
| 2,394,119 | Tomik | Feb. 5, 1946 |
| 2,416,478 | Harbers | Feb. 25, 1947 |
| 2,589,794 | Frantz | Mar. 18, 1952 |
| 2,661,766 | Adams | Dec. 8, 1953 |
| 2,843,213 | Schwartz | July 15, 1958 |
| 2,866,360 | Gerst et al. | Dec. 30, 1958 |